United States Patent
Zhang et al.

(10) Patent No.: US 11,663,072 B2
(45) Date of Patent: May 30, 2023

(54) AVOID SYSTEM RESTART AFTER APPLYING FIXES

(71) Applicant: International Business Machines Corporation, Armonk, NY (US)

(72) Inventors: Gan Zhang, Beijing (CN); Le Chang, Beijing (CN); Ming Lei Zhang, Beijing (CN); Xing Xing Shen, Beijing (CN); Shan Gao, Beijing (CN); Guang Han Sui, Beijing (CN); Zeng Yu Peng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/477,621

(22) Filed: Sep. 17, 2021

(65) Prior Publication Data
US 2023/0091512 A1    Mar. 23, 2023

(51) Int. Cl.
*G06F 11/07* (2006.01)
*G06F 8/65* (2018.01)
*G06F 11/30* (2006.01)

(52) U.S. Cl.
CPC ............ *G06F 11/0793* (2013.01); *G06F 8/65* (2013.01); *G06F 11/302* (2013.01)

(58) Field of Classification Search
CPC ....... G06F 11/0793; G06F 11/302; G06F 8/65
See application file for complete search history.

(56) References Cited

U.S. PATENT DOCUMENTS

| | | | |
|---|---|---|---|
| 7,895,592 B2 * | 2/2011 | Subramanian | G06F 8/65 717/100 |
| 9,304,753 B2 * | 4/2016 | Auer | G06F 8/65 |
| 2016/0019055 A1 | 1/2016 | Pavlik et al. | |
| 2016/0328227 A1 * | 11/2016 | Kharbanda | G06F 8/656 |
| 2021/0026947 A1 | 1/2021 | Korotaev | |

OTHER PUBLICATIONS

Anonymous, "On the fly / runtime patching of computer software," IP.com Prior Art Database Techinical Disclossure, IPCOM000152658D, May 9, 2007, 3 pages.
Booker, "Four Ways to Fix Problems in Windows Without Rebooting and Losing Work," URL: https://www.lifehacker.com.au/2012/06/four-ways-to-fix-problems-in-windows-without-rebooting-and-losing-work/; Published: Jun. 30, 2012; Retrieved: Sep. 1, 2021; 7 pages.
Gite, "How to live patch Ubuntu Linux Kernel without rebooting the server," URL: https://www.cyberciti.biz/faq/howto-live-patch-ubuntu-linux-server-kernel-without-rebooting/; Published: Oct. 23, 2015; Retrieved: Sep. 1, 2021; 12 pages.

* cited by examiner

*Primary Examiner* — Nadeem Iqbal
(74) *Attorney, Agent, or Firm* — Cantor Colburn LLP; Teddi Maranzano

(57) ABSTRACT

A computer-implemented method includes receiving, by a computing system, an update for a computer program executing on the computing system. The method further includes determining, by the computing system, a data structure that is affected by the update by checking a structure change information included in the update. The method further includes checking, by the computing system, instance-count of the data structure, the instance-count representing a number of instances of the data structure in a memory of the computing system. The method further includes based on a determination that the instance-count is zero, applying, by the computing system, the update to the computer program.

20 Claims, 8 Drawing Sheets

Structure Summaries
204

| Data Structure ID | Update In Progress Flag | Instance Count |
|---|---|---|
| #1 | 0/1 | 63 |
| #2 | 0/1 | 0 |
| ... | ... | ... |
| #n | 0/1 | 4 |

FIG. 3

AVOID SYSTEM RESTART AFTER APPLYING FIXES

BACKGROUND

The present invention generally relates to computer technology and, more specifically, avoiding a system restart after applying fixes to the system, such as software updates to an operating system.

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own LPAR, with each LPAR allocated a part of a physical processor, an entire physical processor, or multiple physical processors from the computer. Additionally, a portion of the computer's memory is allocated to each LPAR. An underlying partition manager, often referred to as a hypervisor or virtual machine monitor (VMM), manages and controls the LPARs. The hypervisor is typically a part of the system firmware and manages the allocation of resources to the operating systems and LPARs. As such, one logically partitioned computer may run one or more LPARs and thus virtualize the operations of the applications, operating systems, and other program code configured to operate in those logical partitions.

In addition to sharing the physical processors and memory in a logically partitioned computer, LPARs also typically share other types of physical hardware resources, which are collectively referred to herein as input/output (IO) resources. For example, in order to provide LPARs with access to external networks, logically partitioned computers typically include multiple physical network adapters, e.g., network interface cards (NICs), that are shared by the LPARs, such that each LPAR is allocated at least a part of one or more physical network adapters to enable that LPAR to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fibre Channel over Ethernet (FCoE), etc.

SUMMARY

A computer-implemented method includes receiving, by a computing system, an update for a computer program executing on the computing system. The method further includes determining, by the computing system, a data structure that is affected by the update by checking a structure change information included in the update. The method further includes checking, by the computing system, instance-count of the data structure, the instance-count representing a number of instances of the data structure in a memory of the computing system. The method further includes based on a determination that the instance-count is zero, applying, by the computing system, the update to the computer program.

A system includes a memory, and one or more processors coupled with the memory, the one or more processors configured to perform a method. The method includes receiving, by a computing system, an update for a computer program executing on the computing system. The method further includes determining, by the computing system, a data structure that is affected by the update by checking a structure change information included in the update. The method further includes checking, by the computing system, instance-count of the data structure, the instance-count representing a number of instances of the data structure in a memory of the computing system. The method further includes based on a determination that the instance-count is zero, applying, by the computing system, the update to the computer program.

A computer program product includes a computer-readable memory that has computer-executable instructions stored thereupon, the computer-executable instructions when executed by a processor cause the processor to perform a method. The method includes receiving, by a computing system, an update for a computer program executing on the computing system. The method further includes determining, by the computing system, a data structure that is affected by the update by checking a structure change information included in the update. The method further includes checking, by the computing system, instance-count of the data structure, the instance-count representing a number of instances of the data structure in a memory of the computing system. The method further includes based on a determination that the instance-count is zero, applying, by the computing system, the update to the computer program.

The above-described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts a structure summary according to one or more embodiments of the present invention;

Figure 1:
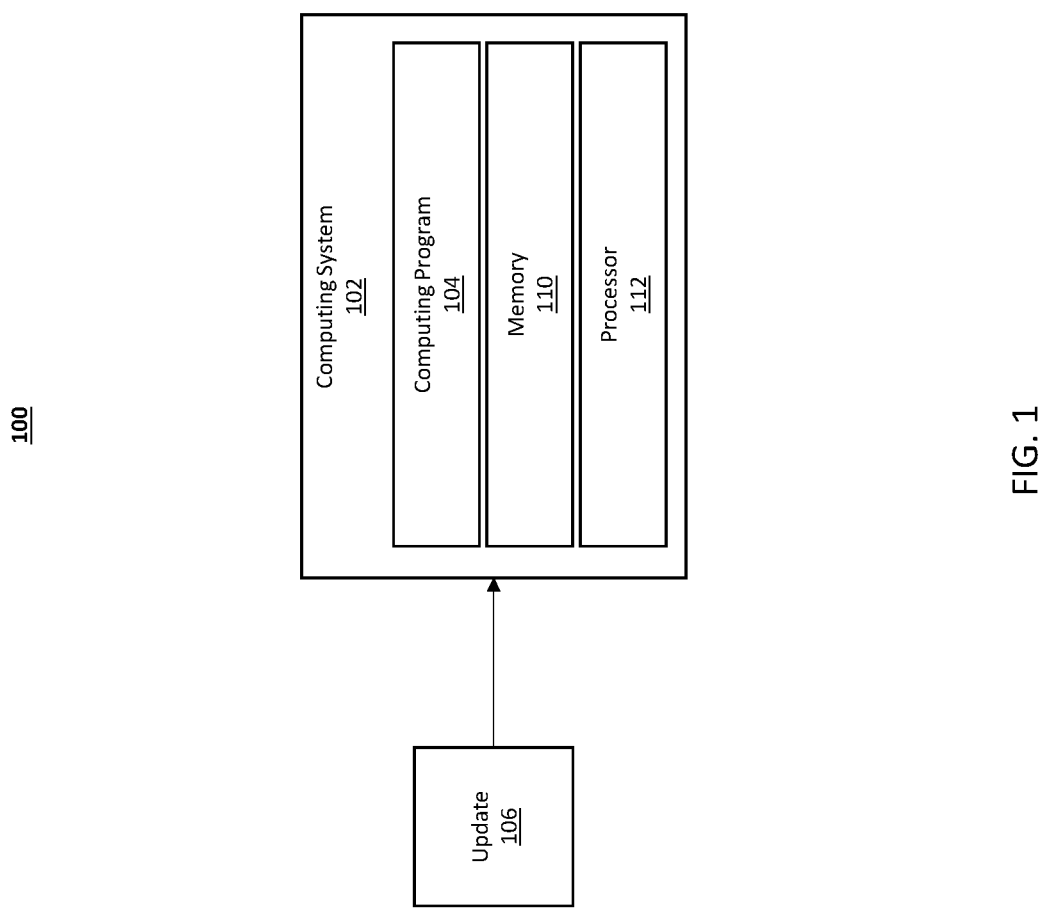
FIG. 1 depicts a computing system to be updated according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted, or modified. Also, the term "coupled", and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Embodiments of the present invention provide technical solutions to improve computing technology, particularly operating systems. Updating or patching a kernel of an operating system generally requires rebooting the computing system on which the operating system is installed. That is, the update or patch of the kernel is installed and then the computing system must be rebooted for the update or patch of the kernel to be loaded and executed on the computing system. This means that kernel fixes or updates cannot be applied to a system without restarting applications after experiencing some downtime to accomplish the rebooting operation. Such restarts cause businesses (e.g., websites, databases, mobile applications, auction sites, e-commerce stores, etc.) running on the computing system to stop and wait for the restart to complete. In today's e-commerce marketplace, every second of such downtime can causally relate to a loss in revenue. A restart can typically require a ten, twenty, or a greater number of minutes for the computing system to be ready for business again, i.e., for the business to be accessible online.

It should be noted that the update to the operating system may not be optional because the update may be crucial for one or more reasons such as, security, efficiency, stability, etc. of the computing system. Accordingly, restarting the computing system after updating the operating system is a technical challenge.

Technical solutions provided by one or more embodiments of the present invention address such technical challenge by avoiding the restart of the operating system after an update. Embodiments of the present invention create a fix management domain (FMD) to help manage the update (i.e., fix application) process. According to one or more embodiments of the present invention, the fix apply conditions are stored into the fix (i.e., update) itself. The FMD collects the fix apply conditions from the fix when the fix is being applied to the computing system, i.e., the operating system. In one or more embodiments of the present invention, the FMD starts a monitor on the conditions of the fix. It holds the fix application until the conditions are satisfied. The fix is applied to the operating system once the conditions are met, and such fix-application (i.e., update) can take effect immediately without an initial public load (IPL) i.e., restarting.

Typically, there are two kinds of causes of system restart after applying an update. One is that because of the update, symbol locations in the memory of the computing system change, together with some change in function logic of a computer program (e.g., operating system) that was being executed prior to the update. Existing solutions to try and address these types of changes include online link loading or dynamic loading of shared libraries. A second cause is data structure change. In this case, instances of data structures being used by the computer program being executed prior to the update already exist in the memory (e.g., random access memory (RAM)) of the computing system. Without a restart, the update to any of the data structures can cause the computing system to be unstable. Hence, developers of such updates mark the update as "restart required", no matter whether the instances of the changed data structure already exist in the memory or not.

Technical solutions described herein address such cases during an update of the computing system to avoid restarting the computing system when instance of the data structures that are being updated are not in the memory, for example.

FIG. 1 depicts a system 100 according to one or more embodiments of the present invention. The system 100 includes a computing system 102 that is executing a computer program 104. The computer program 104 includes one or more computer executable instructions, data, data structures, etc. The computing program 104 can be an operating system of the computing system, a system driver, a library, an executable, a word processing program, a spreadsheet program, a database program, a browser program, a computer game, or any other type of computer program that is executable on the computing system 102.

Executing the computer program 104 causes instances of one or more data structures to be created in a memory 110 of the computing system 102. The computer program 104 is executing by a processor 112 that can include one or more processing units.

An update 106 is to be applied to the computer program 104. The update 106 includes one or more computer executable instructions that update the computer executable instructions, data, data structures, or other aspects of the computer program 104.

It is understood that the computing system 102 can include additional components (hardware and/or software) that are not shown in FIG. 1, such as networking components, storage components, display components, input/output components, etc.

Figure 2:
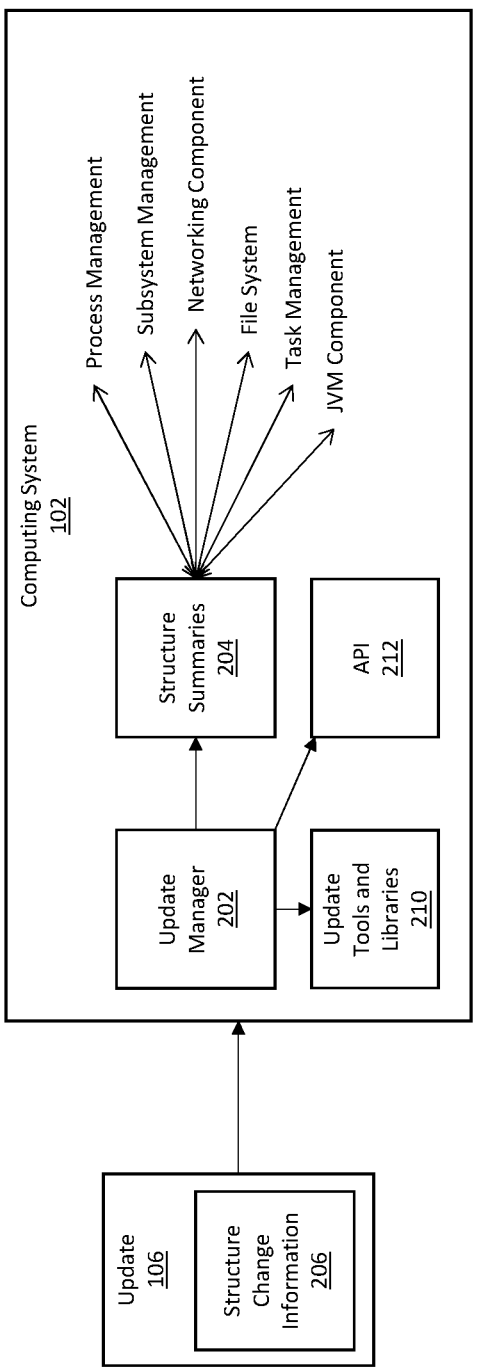
FIG. 2 depicts an example of updating a computing system according to one or more embodiments of the present invention.

FIG. 2 depicts a block diagram of updating a computer program according to one or more embodiments of the present invention. Additional components of the computing system 102 are depicted, which are used by one or more embodiments of the present invention. The computing system 102 includes an update manager 202, which creates a fix management domain (FMD). In the description herein, the FMD and the update manager 202 can be used interchangeably.

The update manager 202 is responsible to apply the update 106 to the computer program 104. In one or more embodiments of the present invention, the update manager 202 uses one or more update tools and libraries 210 to apply the update 106 to the computer program 104. The update tools and libraries can include file editors, text editors, memory defragmenters, or any other such tools and libraries.

In one or more embodiments of the present invention, the update 106 includes a structure change information 206. The structure change information 206 can be a database, a data structure (e.g., a list, a table, etc.), or any other format to provide a description of one or more data structures of the computer program 104 that the update 106 modifies. The structure change information 206 can include a list of unique identifiers (e.g., hash) associated with the data structures of the computer program 104, where the included list of data structures will be affected by the update 106.

The unique identifier of a data structure can be based on the attributes, such as the location (e.g., line number in a file)

name, components, etc., or a combination thereof, of the data structure in the computer program 104. In one or more embodiments of the present invention, the unique identifier is associated with the data structure at compile time of the computer program 104. Each data structure in the computer program 104 is assigned the unique identifier by a compiler, and the identifier is stored in the object file, as well as the executable file of the computer program 104 so that each data structure can be monitored for the update according to one or more embodiments of the present invention.

The computing system 102 stores structure summaries 204 for the computer program 104. The structure summaries 204 includes a count of one or more instances of each unique data structure that the computer program 104 may have created in the memory 110 of the computing system 102 during an ongoing execution of the computer program 104.

FIG. 3 depicts an example implementation of the structure summaries 204 according to one or more embodiments of the present invention. The structure summaries 204 includes an entry 302 for each unique data structure in the computer program 104. The structure summaries 204 can include as many entries as the number of unique data structures in the computer program 104. It should be noted that although the structure summaries 204 is shown as a table, in one or more embodiments of the present invention, the structure summaries 204 can be implemented using any other format.

Each entry 302 includes an identifier of the data structure 310 to which the entry corresponds.

Further, the entry 302 includes a flag 312 that indicates whether an update for that data structure is in progress. The flag 312 can be a binary flag, for example, 0/1, where 0=no update in progress; 1=update in progress. The update manager 202 can change the value of the flag 312. It is understood that the flag 312 can take different values than 0/1 as used herein.

The entry 302 also includes an instance-count 314, which indicates a number of instances of the data structure that are in use by the computer program 104. The instance-count 314, in other words, indicates a number of instances of the data structure in the memory 110.

Only when the flag 312 is 0, the instance-count 314 can be increased and/or decreased for the data structure of the particular entry 302. That is, only when the flag 312 is 0, memory for another instance of the data structure can be allocated or released. When the flag 312 is 1, instance of the data structure cannot be allocated or released.

The update manager 202 performs several operations on the instance-count 314. For example, the update manager 202 increases the content of the instance-count 314 when a memory allocation is performed for creating an instance of the data structure corresponding to the entry 302. The update manager 202 decreases the content of the instance-count 314 when a memory release is performed to deallocate an instance of the data structure. The update manager 202 changes the flag 312 from 0 to 1 before the update 106 is applied to the computer program 104. Further, the update manager 202 changes the flag 312 from 1 to 0 after the update 106 is applied. Table 1 provides an example of updating the instance-count 314 when an instance of the data structure is being created. The other operations can be performed in a similar manner in some embodiments of the present invention. It is understood that the instructions used to implement the operations can vary in one or more embodiments of the present invention.

TABLE 1

```
#define COUNTERFLAG = 0X1000000000000
WHILE not done:
{
   CounterValue = *CounterAddress4UID
   Continue if (CounterValue & COUNTERFLAG == COUNTERFLAG)
   done = cas (CounterAddress4UID, CounterValue, CounterValue+1)
}
malloc ( );
```

The update manager 202 can be executed as a domain thread in the computing system to help manage any request to apply the update 106. In one or more embodiments of the present invention, the update manager 202 creates a monitor thread to handle the conditions to be checked to apply the update 106. The monitor thread is used to check the instance-count 314 values from the structure summaries 204 for one or more data structures that are identified as to be updated in the structure change information 206 of the update 106.

In one or more embodiments of the present invention, if the request's condition is met, which means the instance-count 314 for the structures from the structure change information 206 of the update 106 are zero, the update manager 202, via the monitor thread, changes the flag 312 for the structures to 1 and starts applying the update 106. Instead, if instances of some of the structures requested still exist in the memory 110, then the update manager 202, via the monitor thread, keeps monitoring the required structures' instance-count 314. After the update 106 is applied, the flag 312 is changed back to 0 for the required data structures.

In one or more embodiments of the present invention, to avoid the impact on existing jobs (i.e., computer programs being executed), the computing system can give an option as configuration to limit the time frame in which the update 106 is applied.

As an extension, to avoid restarting critical applications/programs in the computing system 102, one or more embodiments of the present invention can also provide an application programming interface (API) 212 that can be accessed by one or more computer programs 104 that have already been developed. The API 212 facilitates communication of the operating system, and other computer programs 104 with the update manager 202. The communication can include at least the following operations: registering data structures to be monitored; querying instance-count 314 of a data structure; changing flags from 0 to 1 and 1 to 0; and decreasing/increasing the instance-count 314 of a data structure.

Figure 4:
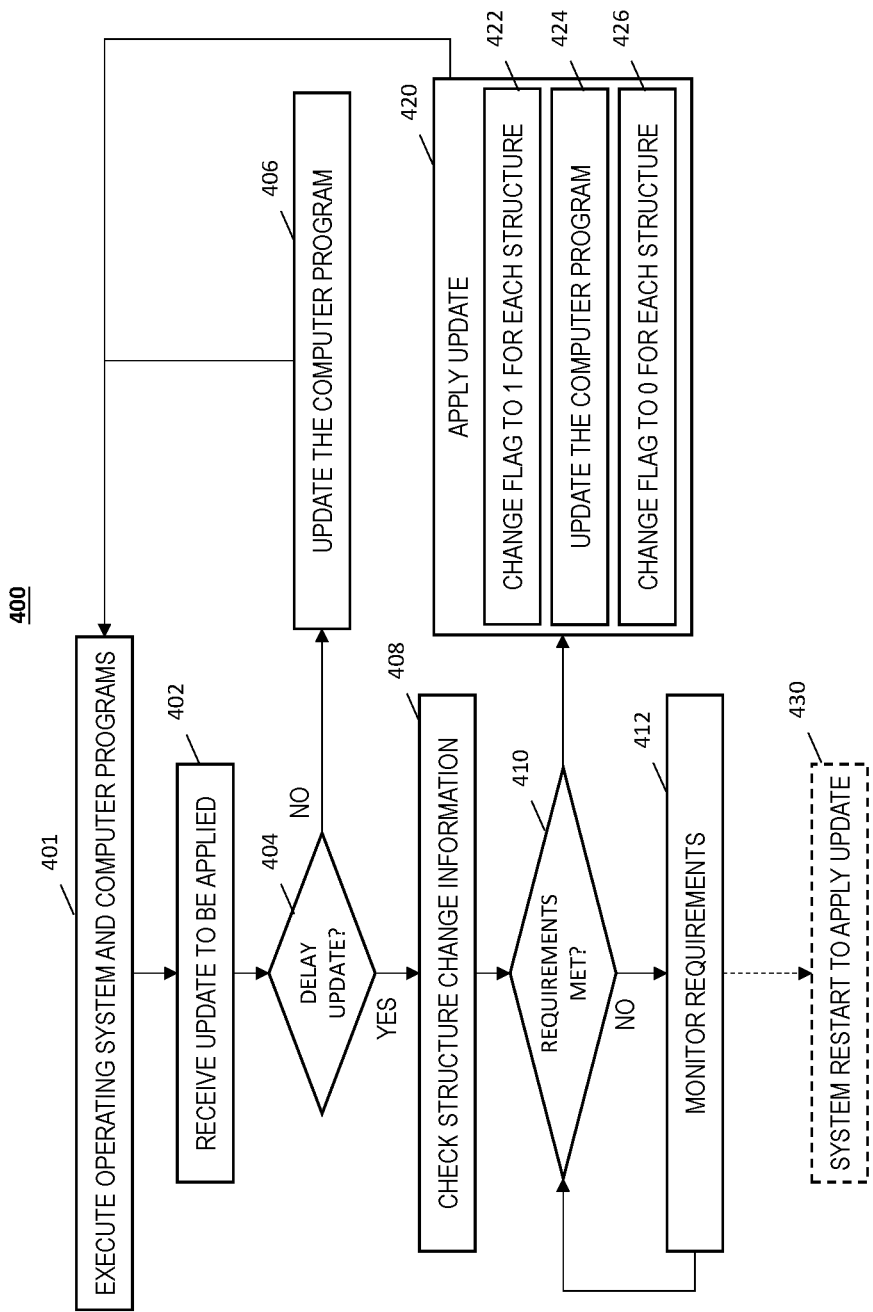
FIG. 4 depicts a flowchart of a method to update a system according to one or more embodiments of the present invention.

FIG. 4 depicts a flowchart of a method 400 for updating a computer program according to one or more embodiments of the present invention. The method 400 is initiated during a typical execution of the operating system and computer programs 104 of the computing system 102, at 401. The computing system 102 receives the update 106 that is to be applied, at block 402. The update 106 can be received in a wired or wireless manner. For example, the update 106 can be received via a communication network, a disk drive, or any other manner.

The update manager 202 checks if the update 106 has to be delayed, at block 404. If the computing system 102 has just started, or if the computer program 104 (that is to be updated) is not executing at present, the update can be immediately applied, i.e., without delay. In such a case, the computer program 104 is updated, at block 406. The computing system 102 is returned to its prior state of executing the operating system and computer programs 104 without a restart in this case.

Alternatively, if the update 106 is deemed to require a delay, the update manager 202 checks the structure change information 206 included in the update 106 to determine whether update requirements are met, at block 408.

Figure 5:
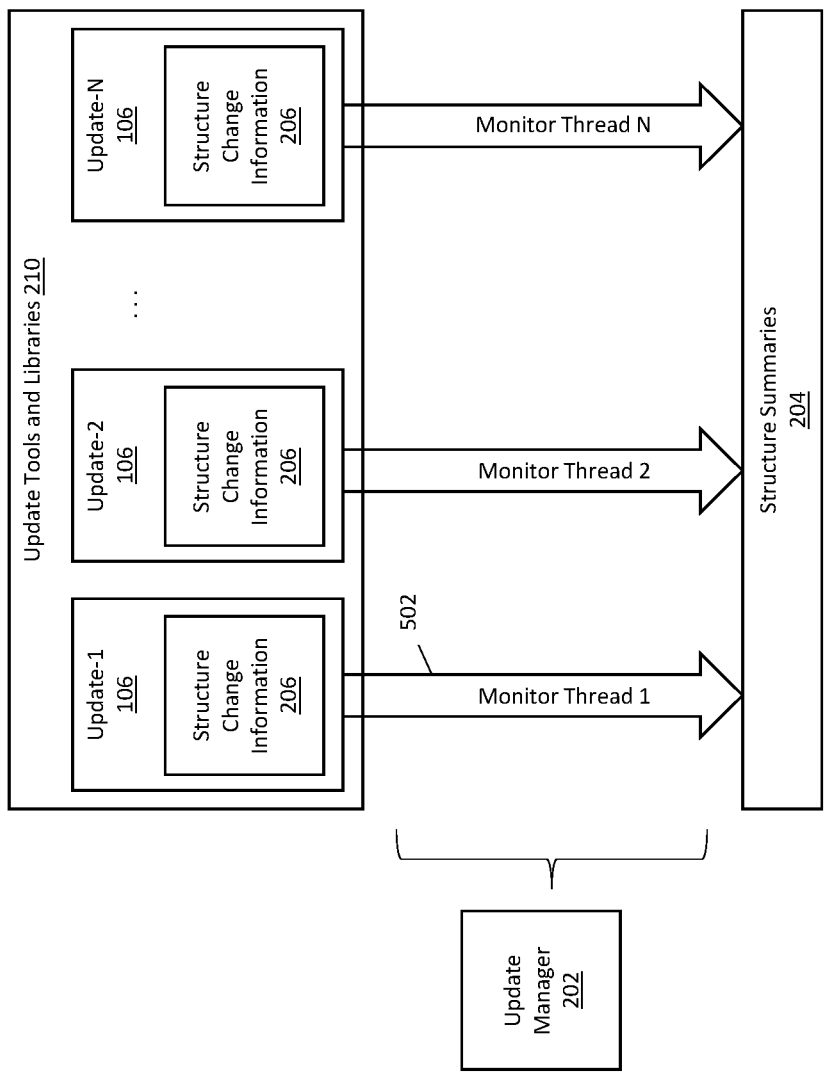
FIG. 5 depicts monitoring structure change information according to one or more embodiments of the present invention.

FIG. 5 depicts checking the update requirements according to one or more embodiments of the present invention. To check the update requirements, the update manager 202 spawns a monitor thread 502 for each update 106 that is to be applied. In one or more embodiments of the present invention, the update that is received can include multiple updates 106. Accordingly, the update manager 202 spawns as many monitor threads 502 as many updates 106 are to be applied to the computing system 102, each monitor thread 502 respectively corresponding to an update 106.

Each monitor thread 502 checks the structure change information 206 from the corresponding update 106. As noted elsewhere, the structure change information 206 includes a list of data structures that will be affected by the update 106. Checking the structure change information 206 includes determining whether one or more instances of any of the data structures in the structure change information 206 exist in the memory 110. The check is performed using the structure summaries 204 maintained by the update manager 202.

As noted elsewhere, the structure summaries 204 includes a list of the data structures instantiated by the computer program 104 along with the corresponding flags 312, and the instance-counts 314. If the data structures that are affected by the update 106 are not instantiated (i.e., instance-count=0), the update requirements are deemed to be met, at block 410. If the requirements are met, the update 106 is applied, at block 420.

Applying the update includes changing the flag 312 of each of the data structures listed in the structure change information 206 to 1, at block 422. The computer program 104 is updated as per the update 106, at block 424. Once the update is applied, the flag 312 of each of the data structures listed in the structure change information 206 is reverted to 0, at block 426.

The computing system 102 can resume the prior state of executing the operating system and computer program at this time, at block 401. In this manner the update 106 can be applied without a system restart.

Alternatively, at block 412, if the requirements are deemed to be unmet, the monitoring of the structure change information 206 is continued. In one or more embodiments of the present invention, the monitoring is continued for a predetermined duration. For example, a timer may be initiated when the requirements are deemed unmet for the first time. If the timer reaches the predetermined duration, the update manger 202 deems that the update 106 cannot be applied without a system restart, and accordingly, restarts the computing system 102 to apply the update 106, at block 430. Alternatively, or in addition, in one or more embodiments of the present invention, the update manager 202 can also monitor a number of checks performed for the requirements before deciding to restart the system to apply the update 106. For example, the update manager 202 maintains a counter for each update 106, where the counter is incremented every time the monitor thread 502 compares the structure change information 206 and the structure summaries 204. If the counter reaches a predetermined value (regardless of the time), the update manager 202 can restart the computing system 102 to apply the update 106.

Embodiments of the present invention facilitate avoiding restarting a computing system when an update is to be applied to a computer program of the computing system. In one or more embodiments of the present invention, a count of instances of each data structures being used by the computer program that is to be updated is maintained and stored. The data structures are associated with unique identifiers at compile time, and these unique identifiers are used to maintain the counts. The update that is to be applied provides a list of the data structures that would be affected by that update, where the list includes the unique identifiers. Based on the information available, embodiments of the present invention can ascertain that computer programs, and data structures, which may be affected by applying the update are not executing, and apply the update only when such conditions are met.

Embodiments of the present invention accordingly provides technical solutions to technical challenges rooted in computing technology by reducing the possibility of system restart, and in turn reducing the down time for customer's businesses running on the system. in other words, embodiments of the present invention facilitate keeping critical applications, which need high availability (e.g., operating system libraries, drivers, etc.), running even during component updates.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
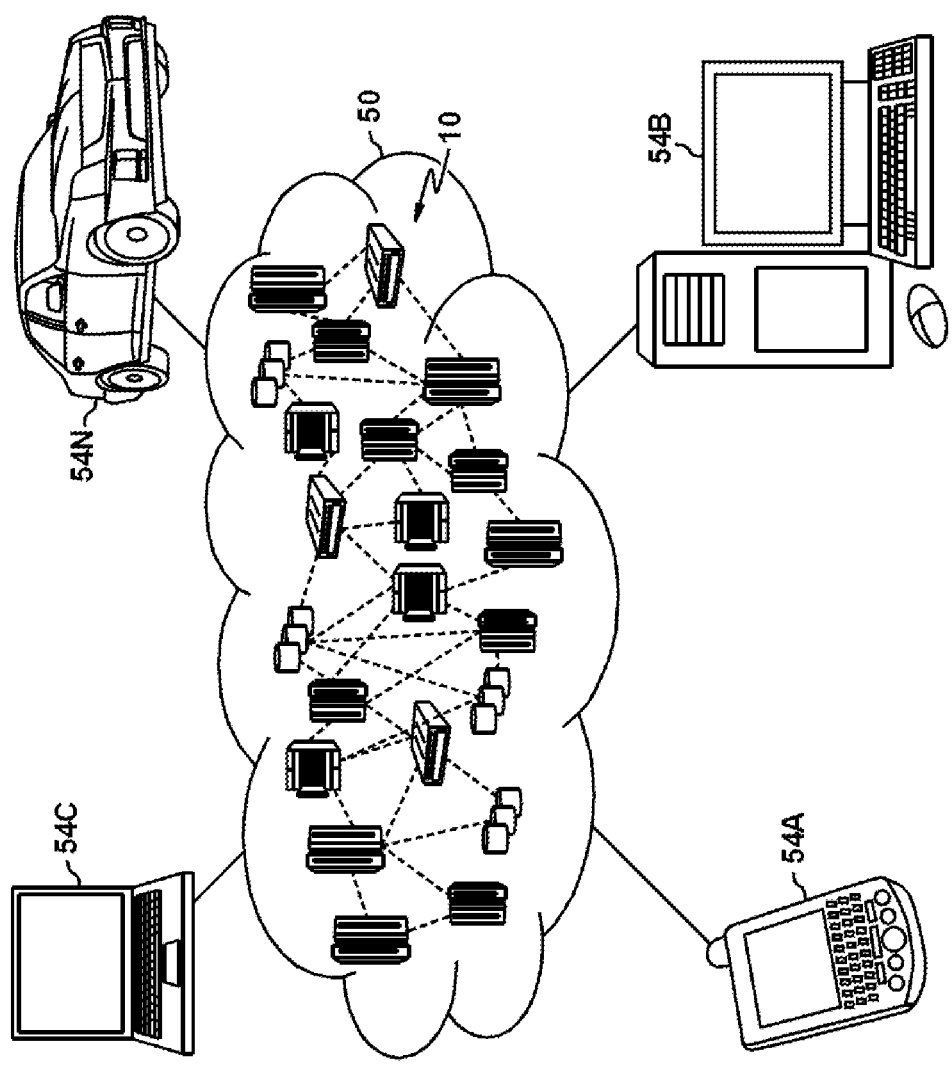
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
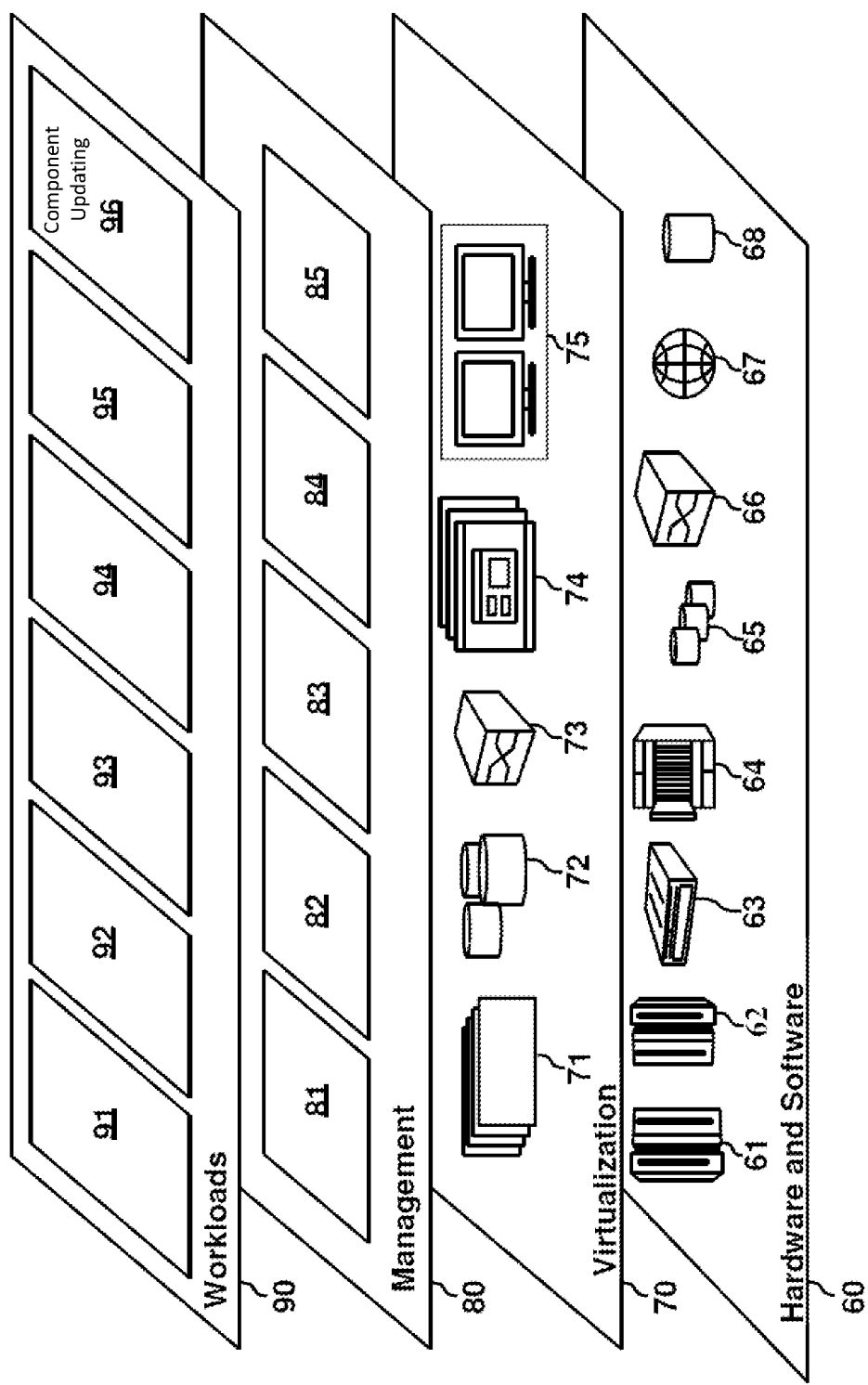
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and component updating 96.

Figure 8:
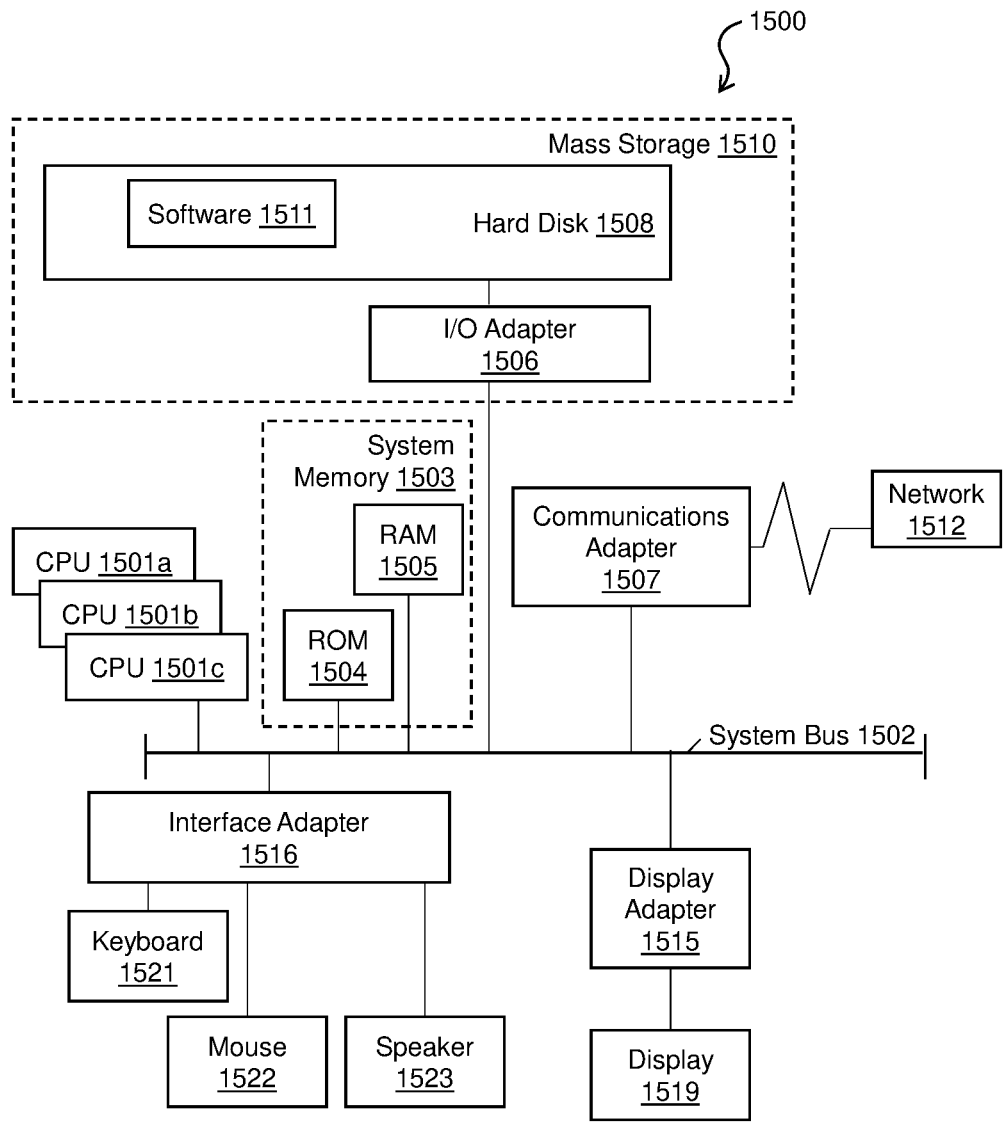
FIG. 8 depicts a computing system according to one or more embodiments of the present invention.

Turning now to FIG. 8, a computer system 1500 is generally shown in accordance with an embodiment. The computer system 1500 can be a computing system 102 being used to execute one or more computer programs 104. The computer system 1500 can be an electronic, computer framework comprising and/or employing any number and combination of computing devices and networks utilizing various communication technologies, as described herein. The computer system 1500 can be easily scalable, extensible, and modular, with the ability to change to different services or reconfigure some features independently of others. The computer system 1500 may be, for example, a server, desktop computer, laptop computer, tablet computer, or smartphone. In some examples, computer system 1500 may be a cloud computing node. Computer system 1500 may be described in the general context of computer system executable instructions, such as program modules, being executed by a computer system. Generally, program modules may include routines, programs, objects, components, logic, data structures, and so on that perform particular tasks or implement particular abstract data types. Computer system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 1500 has one or more central processing units (CPU(s)) 1501*a*, 1501*b*, 1501*c*, etc. (collectively or generically referred to as processor(s) 1501). The processors 1501 can be a single-core processor, multi-core processor, computing cluster, or any number of other configurations. The processors 1501, also referred to as processing circuits, are coupled via a system bus 1502 to a system memory 1503 and various other components. The system memory 1503 can include a read only memory (ROM) 1504 and a random access memory (RAM) 1505. The ROM 1504 is coupled to the system bus 1502 and may include a basic input/output system (BIOS), which controls certain basic functions of the computer system 1500. The RAM is read-write memory coupled to the system bus 1502 for use by the processors 1501. The system memory 1503 provides temporary memory space for operations of said instructions during operation. The system memory 1503 can include random access memory (RAM), read only memory, flash memory, or any other suitable memory systems.

The computer system 1500 comprises an input/output (I/O) adapter 1506 and a communications adapter 1507 coupled to the system bus 1502. The I/O adapter 1506 may be a small computer system interface (SCSI) adapter that communicates with a hard disk 1508 and/or any other similar component. The I/O adapter 1506 and the hard disk 1508 are collectively referred to herein as a mass storage 1510.

Software 1511 for execution on the computer system 1500 may be stored in the mass storage 1510. The mass storage 1510 is an example of a tangible storage medium readable by the processors 1501, where the software 1511 is stored as instructions for execution by the processors 1501 to cause the computer system 1500 to operate, such as is described herein below with respect to the various Figures. Examples of computer program product and the execution of such instruction is discussed herein in more detail. The communications adapter 1507 interconnects the system bus 1502 with a network 1512, which may be an outside network, enabling the computer system 1500 to communicate with other such systems. In one embodiment, a portion of the system memory 1503 and the mass storage 1510 collectively store an operating system, which may be any appropriate operating system, such as the z/OS or AIX operating system from IBM Corporation, to coordinate the functions of the various components shown in FIG. 8.

Additional input/output devices are shown as connected to the system bus 1502 via a display adapter 1515 and an interface adapter 1516 and. In one embodiment, the adapters 1506, 1507, 1515, and 1516 may be connected to one or more I/O buses that are connected to the system bus 1502 via an intermediate bus bridge (not shown). A display 1519 (e.g., a screen or a display monitor) is connected to the system bus 1502 by a display adapter 1515, which may include a graphics controller to improve the performance of graphics intensive applications and a video controller. A keyboard 1521, a mouse 1522, a speaker 1523, etc. can be interconnected to the system bus 1502 via the interface adapter 1516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 1500 includes processing capability in the form of the processors 1501, and storage capability including the system memory 1503 and the mass storage 1510, input means such as the keyboard 1521 and the mouse 1522, and output capability including the speaker 1523 and the display 1519.

In some embodiments, the communications adapter 1507 can transmit data using any suitable interface or protocol, such as the internet small computer system interface, among others. The network 1512 may be a cellular network, a radio network, a wide area network (WAN), a local area network (LAN), or the Internet, among others. An external computing device may connect to the computer system 1500 through the network 1512. In some examples, an external computing device may be an external webserver or a cloud computing node.

It is to be understood that the block diagram of FIG. 8 is not intended to indicate that the computer system 1500 is to include all of the components shown in FIG. 8. Rather, the computer system 1500 can include any appropriate fewer or additional components not illustrated in FIG. 8 (e.g., additional memory components, embedded controllers, modules, additional network interfaces, etc.). Further, the embodiments described herein with respect to computer system 1500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a computing system, an update for a computer program executing on the computing system;
   determining, by the computing system, a data structure that is affected by the update by checking a structure change information included in the update;
   checking, by the computing system, instance-count of the data structure, the instance-count representing a number of instances of the data structure in a memory of the computing system; and based on a determination that the instance-count is zero, applying, by the computing system, the update to the computer program.

2. The computer-implemented method of claim 1, wherein the data structure is associated with a unique identifier.

3. The computer-implemented method of claim 2, wherein the unique identifier is associated with the data structure at compile time of the computer program.

4. The computer-implemented method of claim 1, wherein based on a determination that the instance-count is not zero, continuously monitoring the data structure for at least a predetermined duration.

5. The computer-implemented method of claim 1, wherein applying the update to the computer program comprises updating a structure summary of the computer program prior to updating the computer program.

6. The computer-implemented method of claim 5, wherein applying the update to the computer program further comprises updating the structure summary of the computer program after updating the computer program.

7. The computer-implemented method of claim 6, wherein the structure summary of the computer program includes an entry for each data structure in the computer program, and wherein the entry includes a unique identifier of a corresponding data structure, a flag indicating update-status, and the instance-count of the corresponding data structure.

8. A system comprising:
   a memory; and
   one or more processors coupled with the memory, the one or more processors configured to perform a method comprising:
   receiving an update for a computer program executing on the system;
   determining a data structure that is affected by the update by checking a structure change information included in the update;
   checking instance-count of the data structure, the instance-count representing a number of instances of the data structure in a memory of the computing system; and
   based on a determination that the instance-count is zero, applying the update to the computer program.

9. The system of claim 8, wherein the data structure is associated with a unique identifier.

10. The system of claim 9, wherein the unique identifier is associated with the data structure at compile time of the computer program.

11. The system of claim 8, wherein based on a determination that the instance-count is not zero, continuously monitoring the data structure for at least a predetermined duration.

12. The system of claim 8, wherein applying the update to the computer program comprises updating a structure summary of the computer program prior to updating the computer program.

13. The system of claim 12, wherein applying the update to the computer program further comprises updating the structure summary of the computer program after updating the computer program.

14. The system of claim 13, wherein the structure summary of the computer program includes an entry for each data structure in the computer program, and wherein the entry includes a unique identifier of a corresponding data structure, a flag indicating update-status, and the instance-count of the corresponding data structure.

15. A computer program product comprising a computer-readable memory that has computer-executable instructions stored thereupon, the computer-executable instructions when executed by a processor cause the processor to perform a method comprising:
   receiving an update for a computer program executing on the system;
   determining a data structure that is affected by the update by checking a structure change information included in the update;
   checking instance-count of the data structure, the instance-count representing a number of instances of the data structure in a memory of the computing system; and
   based on a determination that the instance-count is zero, applying the update to the computer program.

16. The computer program product of claim 15, wherein the data structure is associated with a unique identifier.

17. The computer program product of claim 16, wherein the unique identifier is associated with the data structure at compile time of the computer program.

18. The computer program product of claim 15, wherein based on a determination that the instance-count is not zero, continuously monitoring the data structure for at least a predetermined duration.

19. The computer program product of claim 15, wherein applying the update to the computer program comprises updating a structure summary of the computer program prior to updating the computer program.

20. The computer program product of claim 12, wherein applying the update to the computer program further comprises updating the structure summary of the computer program after updating the computer program.

\* \* \* \* \*